United States Patent
Sato et al.

(10) Patent No.: US 8,482,154 B2
(45) Date of Patent: Jul. 9, 2013

(54) UNINTERRUPTIBLE POWER SUPPLY APPARATUS

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 262 days.

(21) Appl. No.: 12/865,875

(22) PCT Filed: Mar. 5, 2009

(86) PCT No.: PCT/JP2009/054146
§ 371 (c)(1),
(2), (4) Date: Aug. 3, 2010

(87) PCT Pub. No.: WO2010/100737
PCT Pub. Date: Sep. 10, 2010

(65) Prior Publication Data
US 2011/0049991 A1    Mar. 3, 2011

(51) Int. Cl.
*H02J 7/00* (2006.01)
*H02J 9/00* (2006.01)

(52) U.S. Cl.
USPC ............... 307/66; 307/44; 307/45; 307/47; 307/50; 307/55; 363/126

(58) Field of Classification Search
USPC ........................................ 307/44–66
See application file for complete search history.

(56) References Cited

U.S. PATENT DOCUMENTS

| | | | |
|---|---|---|---|
| 6,175,511 | B1 | 1/2001 | Ooba |
| 2008/0061628 | A1* | 3/2008 | Nielsen et al. ............... 307/66 |
| 2008/0197706 | A1* | 8/2008 | Nielsen ......................... 307/66 |

FOREIGN PATENT DOCUMENTS

| | | |
|---|---|---|
| CN | 1695290 A | 11/2005 |
| JP | 7 298516 | 11/1995 |
| JP | 10 117476 | 5/1998 |
| JP | 10 248246 | 9/1998 |
| JP | 2001 69762 | 3/2001 |
| JP | 2002 94348 | 3/2002 |
| JP | 2005 253262 | 9/2005 |
| JP | 2007-318893 A | 12/2007 |
| KR | 10-0875530 B1 | 12/2008 |

OTHER PUBLICATIONS

U.S. Appl. No. 13/256,958, filed Sep. 16, 2011, Sato, et al.
U.S. Appl. No. 13/498,009, filed Mar. 23, 2012, Sato, et al.
U.S. Appl. No. 13/498,515, filed Mar. 27, 2012, Sato, et al.
Korean Office Action issued on Aug. 19, 2011, in Patent Application No. 10-2010-7017831. (with English translation).
U.S. Appl. No. 13/202,478, filed Aug. 19, 2011, Sato, et al.
Office Action issued Jan. 14, 2013, in Chinese Patent Application No. 200980135515.x with English-language Translation, 30 pages.

* cited by examiner

*Primary Examiner* — Rexford Barnie
*Assistant Examiner* — Toan Vu
(74) *Attorney, Agent, or Firm* — Oblon, Spivak, McClelland, Maier & Neustadt, L.L.P.

(57) ABSTRACT

In an uninterruptible power supply apparatus, a common mode current flowing from nodes (N1 to N3) to a line of a ground voltage (GND) through a stray capacitance (41) of a battery (40) is limited by a common mode reactor (34), and the low-level common mode current passing through the common mode reactor (34) is caused to flow to a virtual neutral line (NL) through a common mode capacitor (37). Therefore, the level of noise caused by the common mode current can be reduced.

12 Claims, 14 Drawing Sheets

FIG.2
(a) BATTERY CHARGE MODE 1
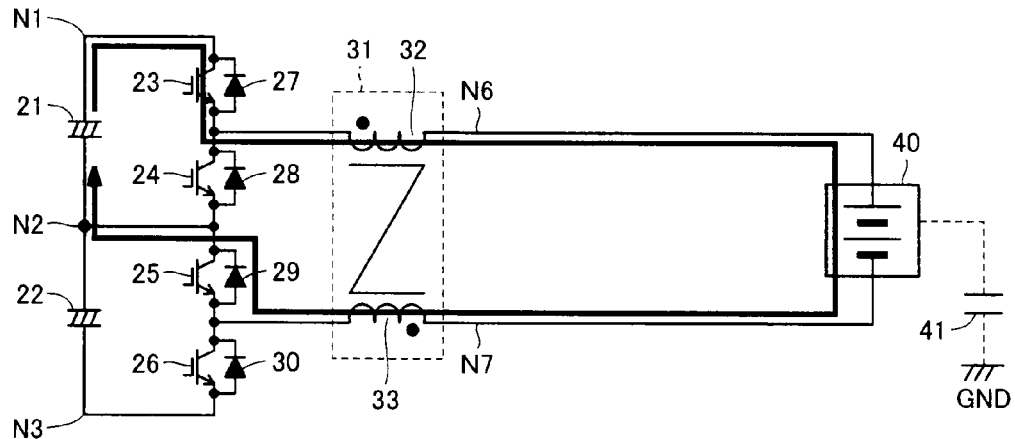
(b) BATTERY CHARGE MODE 2
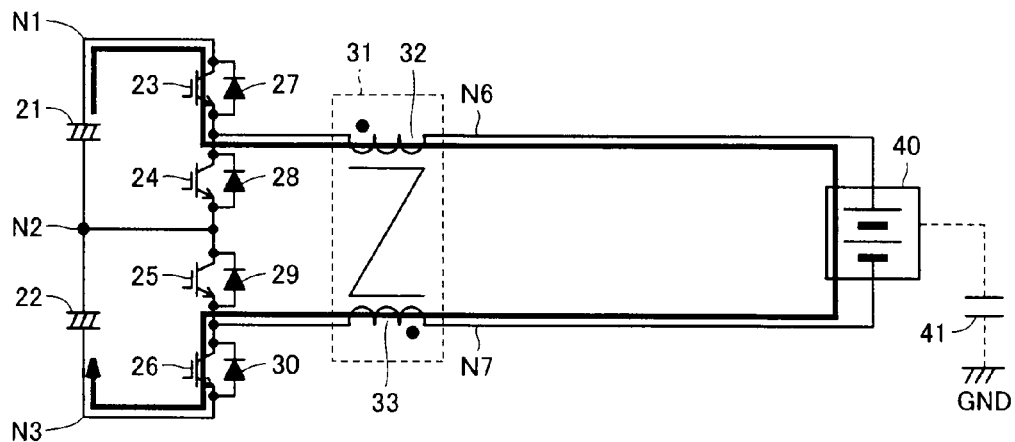
(c) BATTERY CHARGE MODE 3
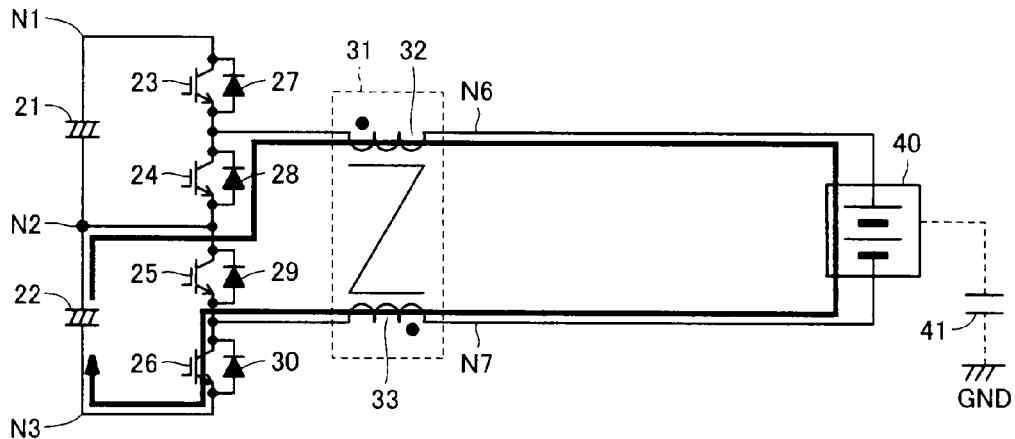

FIG.3
(a) BATTERY DISCHARGE MODE 1
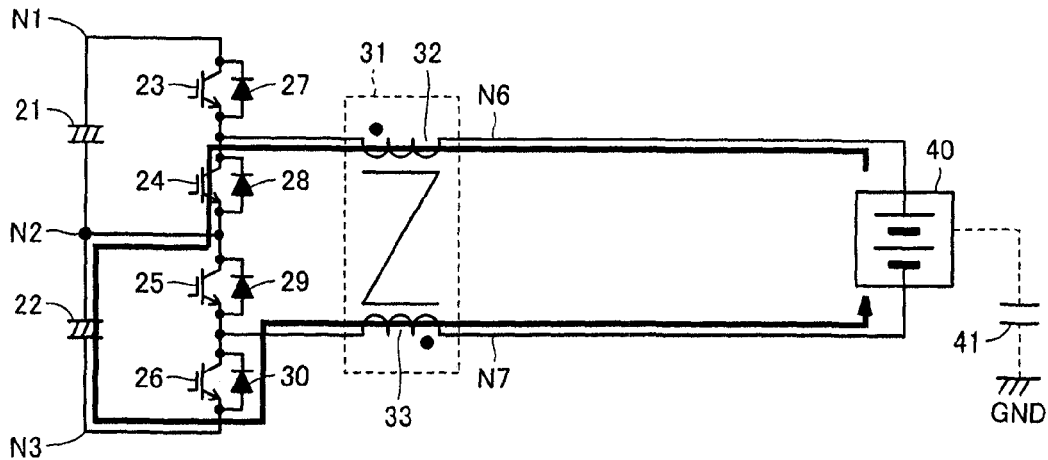
(b) BATTERY DISCHARGE MODE 2
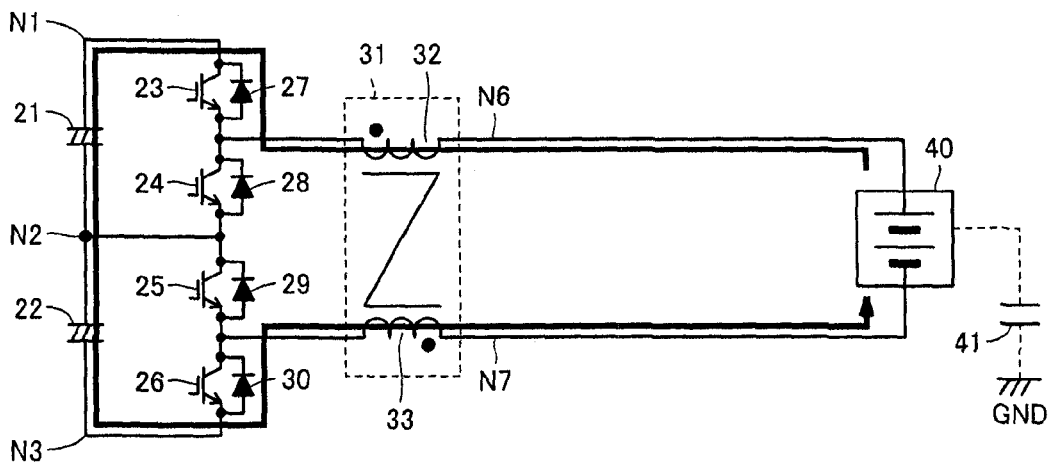
(c) BATTERY DISCHARGE MODE 3
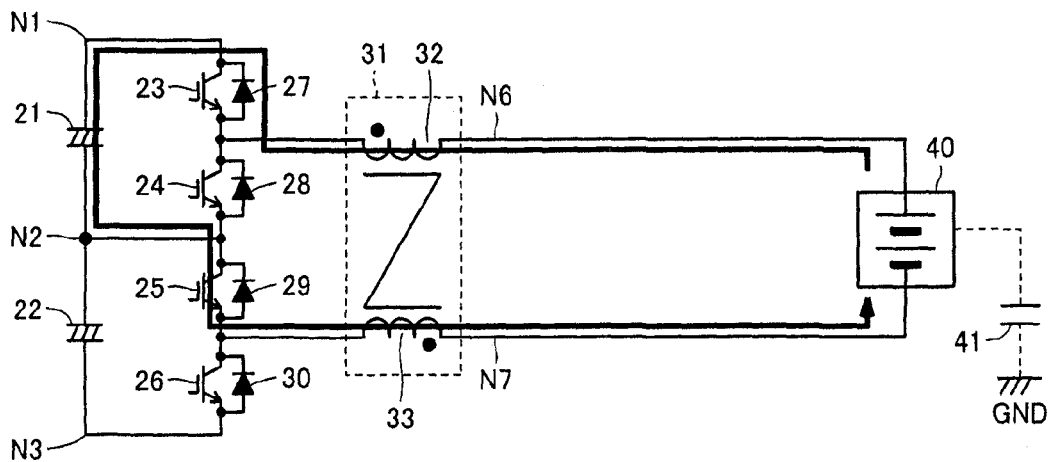

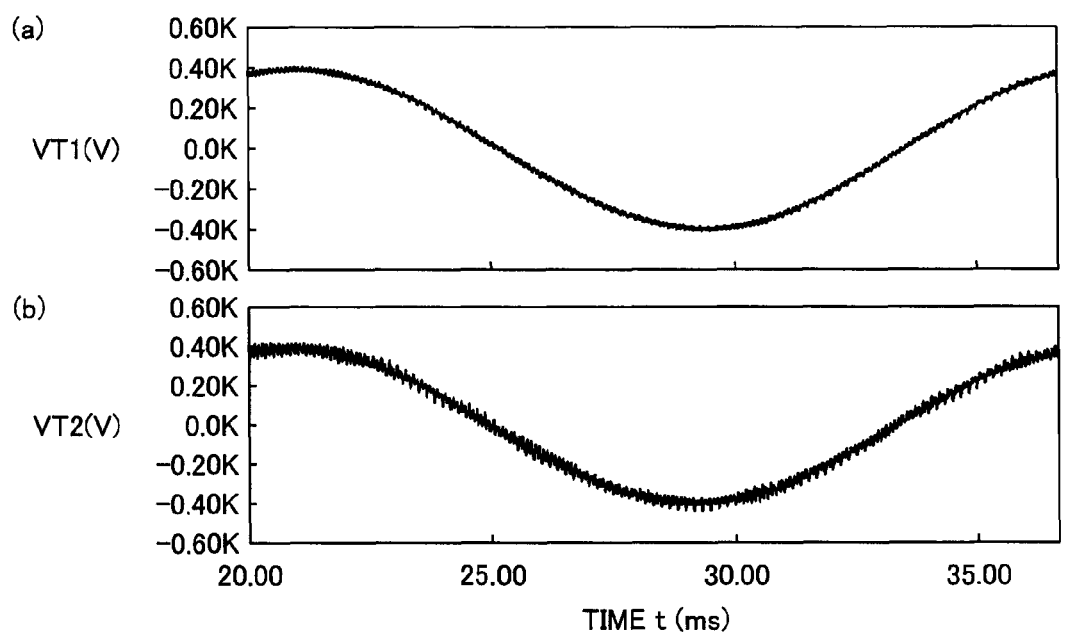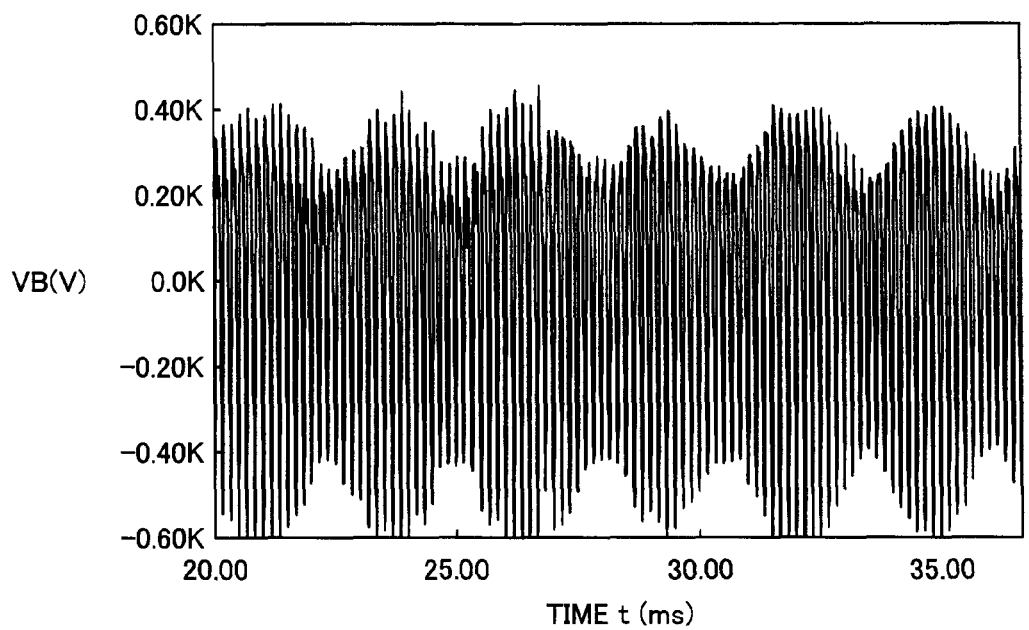

(a) VT1(V)

(b) VT2(V)

VB(V)

UNINTERRUPTIBLE POWER SUPPLY APPARATUS

TECHNICAL FIELD

The present invention relates to an uninterruptible power supply apparatus, and particularly to an uninterruptible power supply apparatus including a PWM (Pulse Width Modulation) converter, a PWM inverter, and a bidirectional chopper circuit.

BACKGROUND ART

Conventionally, uninterruptible power supply apparatuses have been widely used as power supply apparatuses for stably supplying alternating current (AC) power to an important load such as a computer system. As shown for example in Japanese Patent Laying-Open No. 07-298516 (Patent Document 1), an uninterruptible power supply apparatus generally includes a converter converting commercial AC voltage to direct current (DC) voltage, an inverter converting DC voltage to AC voltage and supplying the AC voltage to a load, and a bidirectional chopper circuit supplying the DC voltage generated by the converter to a battery when the commercial AC voltage is supplied and supplying DC voltage of the battery to the inverter when the commercial AC voltage is interrupted.
Patent Document 1: Japanese Patent Laying-Open No. 07-298516

DISCLOSURE OF THE INVENTION

Problems to be Solved by the Invention

However, in the conventional uninterruptible power supply apparatus, a ripple voltage with a carrier frequency of the converter, the inverter, and the bidirectional chopper circuit appears on a line of the DC voltage, a common mode current based on the ripple voltage flows from the line of the DC voltage to a line of a ground voltage, through the bidirectional chopper circuit and a stray capacitance of the battery, and thereby noise is caused.

Accordingly, a main object of the present invention is to provide a low-noise uninterruptible power supply apparatus.

Means for Solving the Problems

An uninterruptible power supply apparatus in accordance with the present invention includes a PWM converter generating a DC voltage based on a first AC voltage and outputting the DC voltage to between first and second nodes, a first capacitor connected between the first and second nodes, a PWM inverter receiving the DC voltage and generating a second AC voltage, a common mode reactor having first and second coils with one terminals thereof being connected to a positive electrode and a negative electrode of a battery, respectively, and a bidirectional chopper circuit connected to the first and second nodes and connected to the other terminals of the first and second coils, supplying DC power from the first capacitor to the battery through the common mode reactor when the first AC voltage is supplied, and supplying DC power from the battery to the first capacitor through the common mode reactor when supply of the first AC voltage is stopped.

Further, another uninterruptible power supply apparatus in accordance with the present invention includes a PWM converter generating a DC voltage based on a first AC voltage and outputting the DC voltage to between first and second nodes, a first capacitor connected between the first and second nodes, a PWM inverter receiving the DC voltage and generating a second AC voltage, a bidirectional chopper circuit connected to the first and second nodes, supplying DC power from the first capacitor to a battery when the first AC voltage is supplied, and supplying DC power from the battery to the first capacitor when supply of the first AC voltage is stopped, a second capacitor connected between a positive electrode of the battery and a virtual neutral line, and a third capacitor connected between a negative electrode of the battery and the virtual neutral line.

Effects of the Invention

In the uninterruptible power supply apparatus in accordance with the present invention, a common mode reactor is provided between a bidirectional chopper circuit and a battery, and this can suppress a common mode current from flowing between the bidirectional chopper circuit and the battery, and can reduce noise.

In the other uninterruptible power supply apparatus in accordance with the present invention, capacitors are connected between electrodes of a battery and a virtual neutral line, and a common mode current is caused to flow to the virtual neutral line, and this can reduce noise.

BRIEF DESCRIPTION OF THE DRAWINGS

FIG. 2 is a circuit diagram showing a battery charge mode of a bidirectional chopper circuit shown in FIG. 1.

FIG. 3 is a circuit diagram showing a battery discharge mode of the bidirectional chopper circuit shown in FIG. 1.

FIG. 11 is a waveform diagram showing voltages at the input terminal and the output terminal during battery charging in a case shown in FIG. 10.

FIG. 12 is a waveform diagram showing a voltage at the negative electrode of the battery during battery charging in the case shown in FIG. 10.

DESCRIPTION OF THE REFERENCE SIGNS

1: AC input filter, 2, 7, 8, 14, 21, 22, 38, 39: capacitor, 3, 13: reactor, 4, 50: PWM converter, 5, 11, 27-30, 53, 54: diode, 6, 10, 23-26: IGBT element, 9, 51: PWM inverter, 12: AC output filter, 20, 52: bidirectional chopper circuit, 31: normal mode reactor, 32, 33, 35, 36: coil, 34: common mode reactor, 37: common mode capacitor, 40: battery, 41: stray capacitance, 42, 43: resistive element, 71: commercial AC power supply, 72: load circuit, T1: input terminal, T2: output terminal.

BEST MODES FOR CARRYING OUT THE INVENTION

First Embodiment

Figure 1:
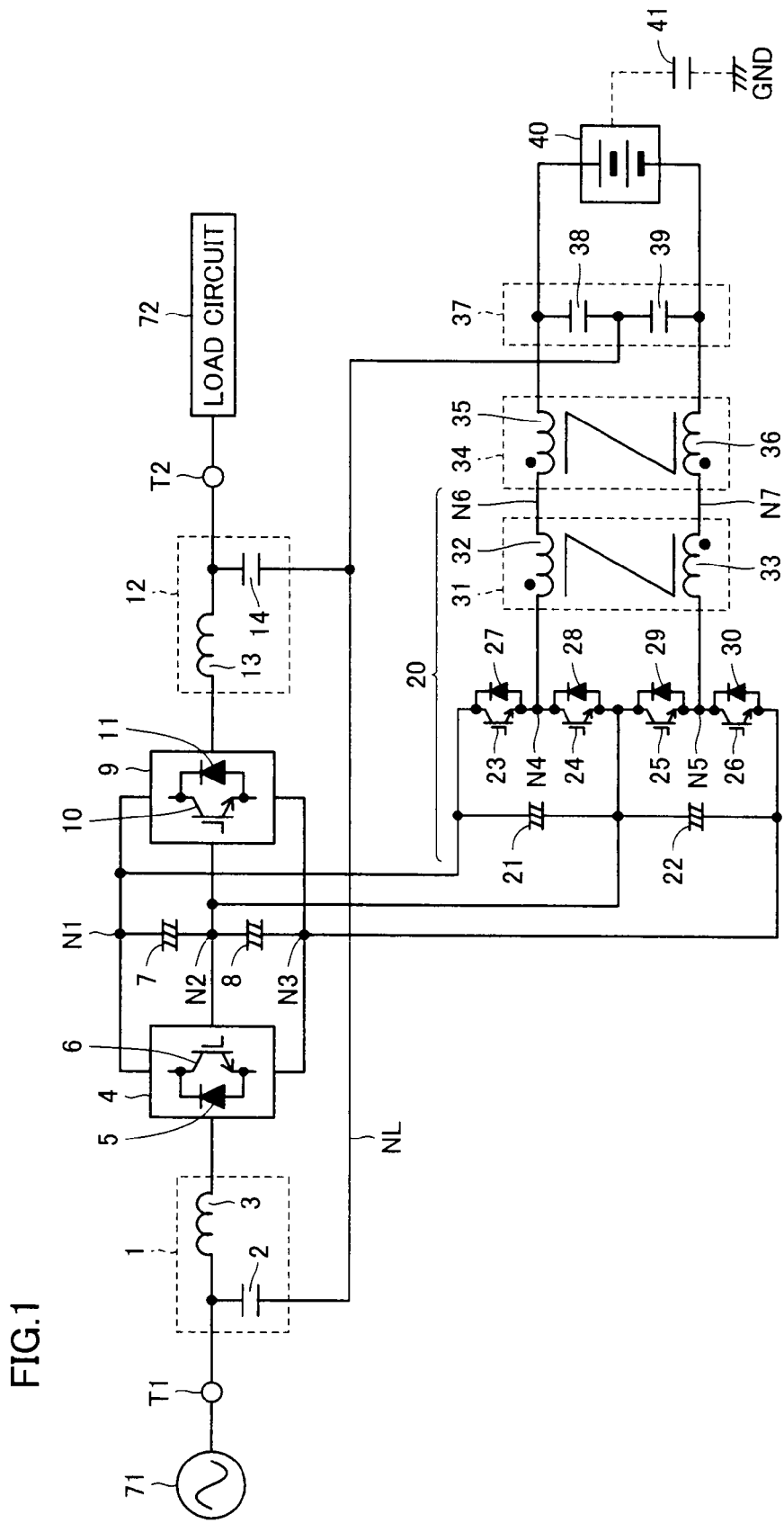
FIG. 1 is a circuit block diagram showing a configuration of an uninterruptible power supply apparatus according to a first embodiment of the present invention.

FIG. 1 is a circuit block diagram showing a configuration of an uninterruptible power supply apparatus according to a first embodiment of the present invention. In FIG. 1, the uninterruptible power supply apparatus includes an input terminal T1, an AC input filter 1, a PWM converter 4, capacitors 7 and 8, a PWM inverter 9, an AC output filter 12, an output terminal T2, a bidirectional chopper circuit 20, a common mode reactor 34, a common mode capacitor 37, and a battery 40. Input terminal T1 receives AC voltage from a commercial AC power supply 71.

AC input filter 1 includes a capacitor 2 and a reactor 3. Capacitor 2 has one electrode connected to input terminal T1, and the other electrode connected to a virtual neutral line NL. Reactor 3 has one terminal connected to input terminal T1, and the other terminal connected to an input terminal of PWM converter 4.

AC input filter 1 is a low-pass filter passing a signal with a frequency of AC voltage (for example, 60 Hz) and cutting a signal with a carrier frequency generated in PWM converter 4 (for example, 10 kHz). Accordingly, the AC voltage is transmitted from commercial AC power supply 71 via AC input filter 1 to PWM converter 4, and voltage with the carrier frequency generated in PWM converter 4 is cut by AC input filter 1. This prevents commercial AC power supply 71 from being affected by the voltage with the carrier frequency generated in PWM converter 4.

PWM converter 4 is a well-known one including a plurality of sets of diodes 5 and IGBT (Insulated Gate Bipolar Transistor) elements 6, and generates a positive voltage, a neutral point voltage, and a negative voltage based on the AC voltage supplied from commercial AC power supply 71 via AC input filter 1. Each of a plurality of IGBT elements 6 in PWM converter 4 is subjected to PWM control with the carrier frequency, and keeps each of the positive voltage, the neutral point voltage, and the negative voltage constant, while maintaining input current in the form of a sine wave and maintaining an input power factor at 1. The voltage with the carrier frequency described above is generated at the input terminal of PWM converter 4 along with switching of the plurality of IGBT elements 6.

The positive voltage, the neutral point voltage, and the negative voltage generated in PWM converter 4 are supplied to nodes N1 to N3, respectively. Capacitor 7 is connected between nodes N1 and N2, and charged to a voltage representing a difference between the positive voltage and the neutral point voltage. Capacitor 8 is connected between nodes N2 and N3, and charged to a voltage representing a difference between the neutral point voltage and the negative voltage.

PWM inverter 9 is a well-known one including a plurality of sets of IGBT elements 10 and diodes 11, and generates AC voltage based on the positive voltage, the neutral point voltage, and the negative voltage at nodes N1 to N3. Each of a plurality of IGBT elements 10 in PWM inverter 9 is subjected to PWM control with the carrier frequency (for example, 10 kHz) higher than the frequency of the AC voltage (for example, 60 Hz), and maintains output voltage to be a constant sine wave voltage. Also in PWM inverter 9, the voltage with the carrier frequency is generated at an output terminal of PWM inverter 9 along with switching of the plurality of IGBT elements 10.

AC output filter 12 includes a reactor 13 and a capacitor 14. Reactor 13 has one terminal connected to the output terminal of PWM inverter 9, and the other terminal connected to output terminal T2. Output terminal T2 is connected to a load circuit (for example, a computer system) 72. Capacitor 14 has one electrode connected to output terminal T2, and the other electrode connected to virtual neutral line NL.

AC output filter 12 is a low-pass filter passing a signal with a frequency of the AC voltage and cutting a signal with the carrier frequency generated in PWM inverter 9. Accordingly, the AC voltage is transmitted from PWM inverter 9 via AC output filter 12 to load circuit 72, and voltage with the carrier frequency generated in PWM inverter 9 is cut by AC output filter 12. This prevents load circuit 72 from being affected by the voltage with the carrier frequency generated in PWM inverter 9.

Bidirectional chopper circuit 20 supplies DC power from capacitors 7 and 8 to battery 40 when the AC voltage is supplied from commercial AC power supply 71, and supplies DC power from battery 40 to capacitors 7 and 8 when supply of the AC voltage from commercial AC power supply 71 is stopped, that is, when power failure occurs.

Specifically, bidirectional chopper circuit 20 includes capacitors 21 and 22, IGBT elements 23 to 26, diodes 27 to 30, and a normal mode reactor (DC reactor) 31. Capacitors 21 and 22 are connected in parallel with capacitors 7 and 8, respectively. IGBT elements 23 and 24 are connected in series between nodes N1 and N2, and IGBT elements 25 and 26 are connected in series between nodes N2 and N3. Diodes 27 to 30 are connected in antiparallel with IGBT elements 23 to 26, respectively.

Normal mode reactor 31 includes a coil 32 connected between a node N6 and a node N4 between IGBT elements 23 and 24, and a coil 33 connected between a node N7 and a node N5 between IGBT elements 25 and 26. Normal mode reactor 31 is a reactor that acts as a reactor for a normal mode current but does not act as a reactor for a common mode current.

The normal mode current refers to a current flowing through coils 32 and 33 in opposite directions (for example, a current flowing from node N4 through coil 32 to node N6 and flowing from node N7 through coil 33 to node N5). The common mode current refers to a current flowing through coils 32 and 33 in the same direction (for example, a current flowing from node N4 through coil 32 to node N6 and flowing from node N5 through coil 33 to node N7).

FIGS. 2(a) to 2(c) are circuit diagrams showing operation of bidirectional chopper circuit 20 when the AC voltage is supplied from commercial AC power supply 71. It is to be noted that common mode reactor 34 and common mode capacitor 37 are not shown.

When the AC voltage is supplied from commercial AC power supply 71, DC power is supplied from capacitors 21 and 22 to battery 40, and battery 40 is charged. On this occasion, IGBT elements 24 and 25 are fixed in a nonconductive state, and IGBT elements 23 and 26 are alternately placed in a conductive state.

Specifically, in a battery charge mode 1, as shown in FIG. 2(a), IGBT elements 24 to 26 become nonconductive and IGBT element 23 becomes conductive. Thereby, the normal mode current flows from node N1, through IGBT element 23, coil 32, battery 40, coil 33, and diode 29, to node N2, and capacitor 21 is discharged and battery 40 is charged.

Further, in a battery charge mode 2, as shown in FIG. 2(b), IGBT elements 24 and 25 become nonconductive and IGBT elements 23 and 26 become conductive. Thereby, the normal mode current flows from node N1, through IGBT element 23, coil 32, battery 40, coil 33, and IGBT element 26, to node N3, and capacitors 21 and 22 are discharged and battery 40 is charged.

Furthermore, in a battery charge mode 3, as shown in FIG. 2(c), IGBT elements 23 to 25 become nonconductive and IGBT element 26 becomes conductive. Thereby, the normal mode current flows from node N2, through diode 28, coil 32, battery 40, coil 33, and IGBT element 26, to node N3, and capacitor 22 is discharged and battery 40 is charged.

Battery charge modes 1 and 3 are performed alternately. In a period between battery charge modes 1 and 3, the normal mode current flows from node N2, through diode 28, coil 32, battery 40, coil 33, and diode 29, to node N2. Battery charge mode 2 is a mode in which battery charge modes 1 and 3 are superimposed.

FIGS. 3(a) to 3(c) are circuit diagrams showing operation of bidirectional chopper circuit 20 when supply of the AC voltage from commercial AC power supply 71 is stopped. It is to be noted that common mode reactor 34 and common mode capacitor 37 are not shown.

When supply of the AC voltage from commercial AC power supply 71 is stopped, DC power is supplied from battery 40 to capacitors 21 and 22, and capacitors 21 and 22 are charged. On this occasion, IGBT elements 23 and 26 are fixed in a nonconductive state, and IGBT elements 24 and 25 are alternately placed in a conductive state.

Specifically, in a battery discharge mode 1, as shown in FIG. 3(a), IGBT elements 23, 25, and 26 become nonconductive and IGBT element 24 becomes conductive. Thereby, the normal mode current flows from a positive electrode of battery 40, through coil 32, IGBT element 24, capacitor 22, diode 30, and coil 33, to a negative electrode of battery 40, and battery 40 is discharged and capacitor 22 is charged.

Further, in a battery discharge mode 2, as shown in FIG. 3(b), IGBT elements 23 to 26 become nonconductive. Thereby, the normal mode current flows from the positive electrode of battery 40, through coil 32, diode 27, capacitors 21 and 22, diode 30, and coil 33, to the negative electrode of battery 40, and battery 40 is discharged and capacitors 21 and 22 are charged.

Furthermore, in a battery discharge mode 3, as shown in FIG. 3(c), IGBT elements 23, 24, and 26 become nonconductive and IGBT element 25 becomes conductive. Thereby, the normal mode current flows from the positive electrode of battery 40, through coil 32, diode 27, capacitor 21, IGBT element 25, and coil 33, to the negative electrode of battery 40, and battery 40 is discharged and capacitor 21 is charged.

Battery discharge modes 1 and 3 are performed alternately. When a voltage across nodes N1 and N3 is lower than a voltage of battery 40 in a period between battery discharge modes 1 and 3, battery discharge mode 2 is performed.

Figure 4:
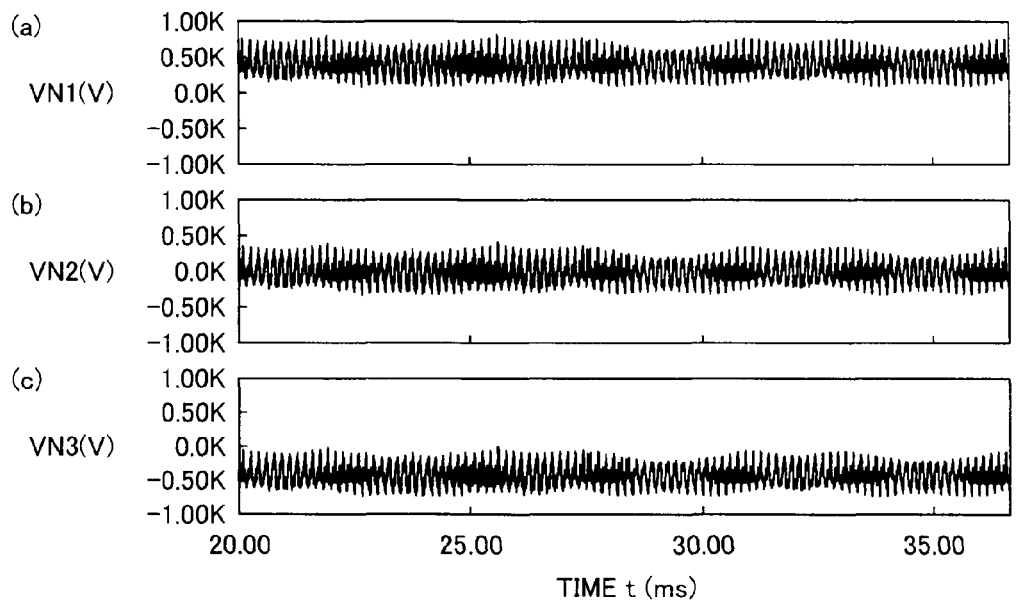
FIG. 4 is a waveform diagram showing a ripple voltage generated at nodes N1 to N3 shown in FIG. 1.

FIGS. 4(a) to 4(c) are waveform diagrams showing voltages VN1 to VN3 at nodes N1 to N3, respectively. As shown in FIG. 4(a), voltage VN1 at node N1 is a voltage in which a ripple voltage with the carrier frequency generated in PWM converter 4, PWM inverter 9, and bidirectional chopper circuit 20 is superimposed on the positive voltage. As shown in FIG. 4(b), voltage VN2 at node N2 is a voltage in which the ripple voltage described above is superimposed on the neutral point voltage. As shown in FIG. 4(c), voltage VN3 at node N3 is a voltage in which the ripple voltage described above is superimposed on the negative voltage.

Figure 5:
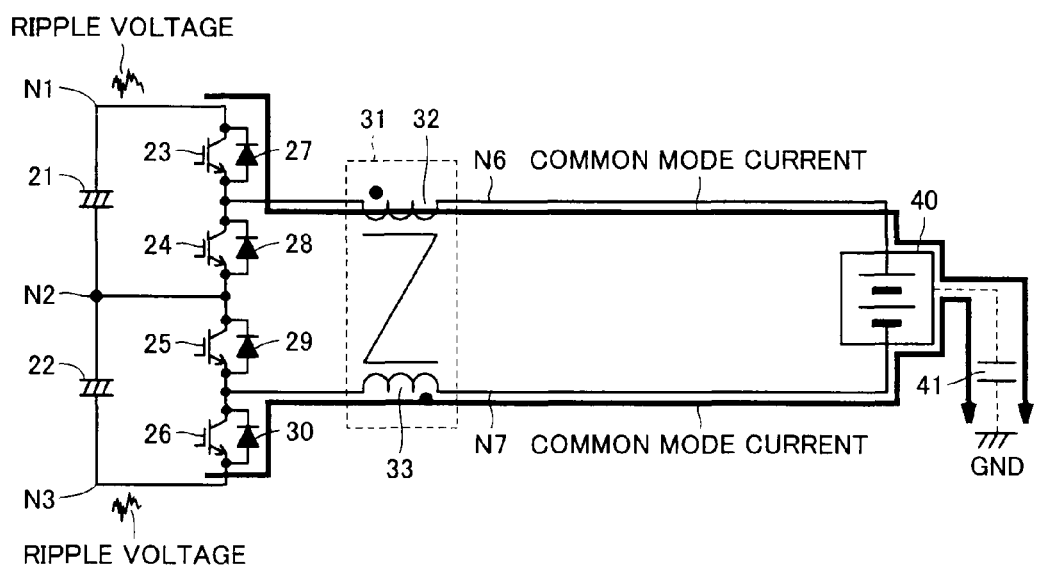
FIG. 5 is a circuit diagram showing a common mode current when a common mode reactor and a common mode capacitor are not provided.

Further, as shown in FIG. 5, a stray capacitance 41 is present between each of the positive and negative electrodes of battery 40 and a line of a ground voltage GND. Therefore, when common mode reactor 34 and common mode capacitor 37 are not provided, the common mode current based on the ripple voltage flows from nodes N1 to N3, through diodes 27 to 30, normal mode reactor 31, battery 40, and stray capacitance 41, to the line of ground voltage GND. Therefore, noise occurs from a line through which the common mode current flows.

Further, the common mode current flowing into the line of ground voltage GND returns to nodes N1 to N3, through stray capacitances present everywhere in the uninterruptible power supply apparatus shown in FIG. 1. Therefore, a large ripple voltage is generated at input terminal T1, output terminal T2, and the electrodes of battery 40, and the ripple voltage negatively affects commercial AC power supply 71, load circuit 72, and battery 40.

Figure 6:
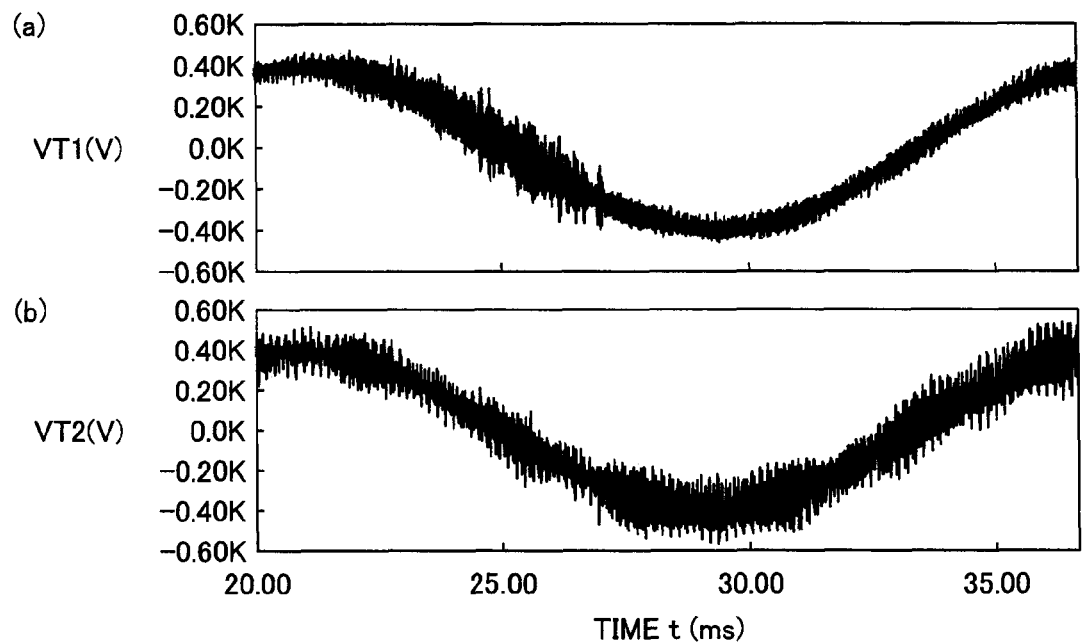
FIG. 6 is a waveform diagram showing voltages at an input terminal and an output terminal during battery charging in a case shown in FIG. 5.
Figure 7:
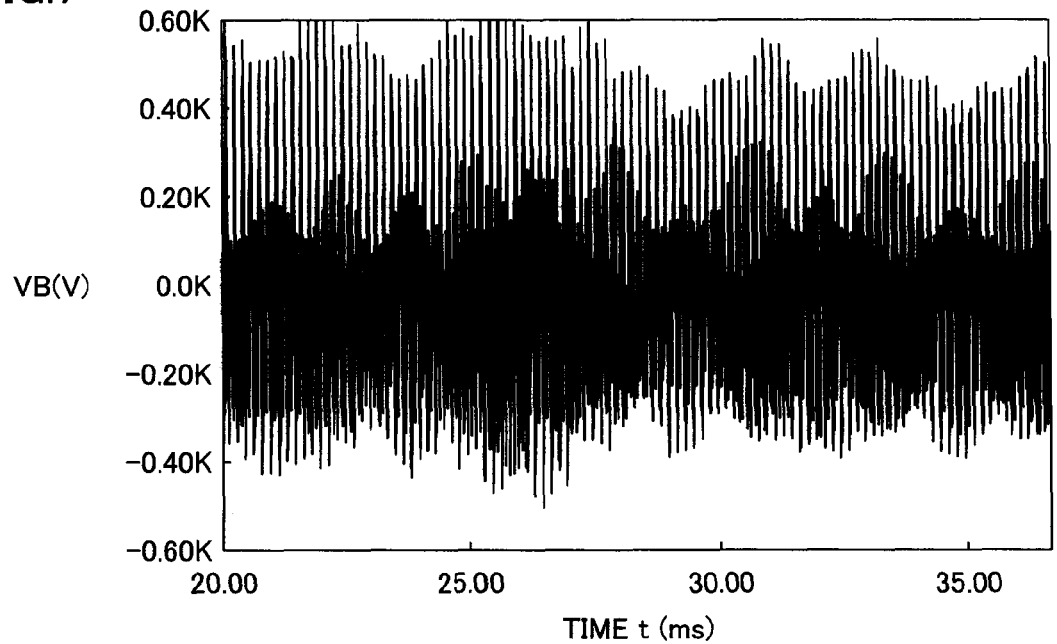
FIG. 7 is a waveform diagram showing a voltage at a negative electrode of a battery during battery charging in the case shown in FIG. 5.
Figure 8:
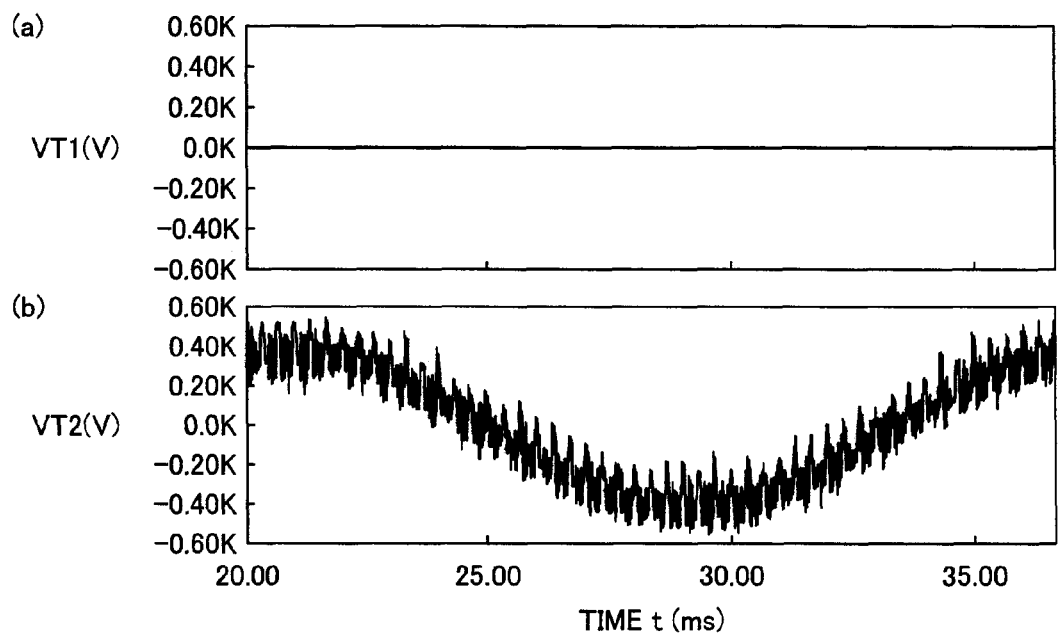
FIG. 8 is a waveform diagram showing voltages at the input terminal and the output terminal during battery discharging in the case shown in FIG. 5.
Figure 9:
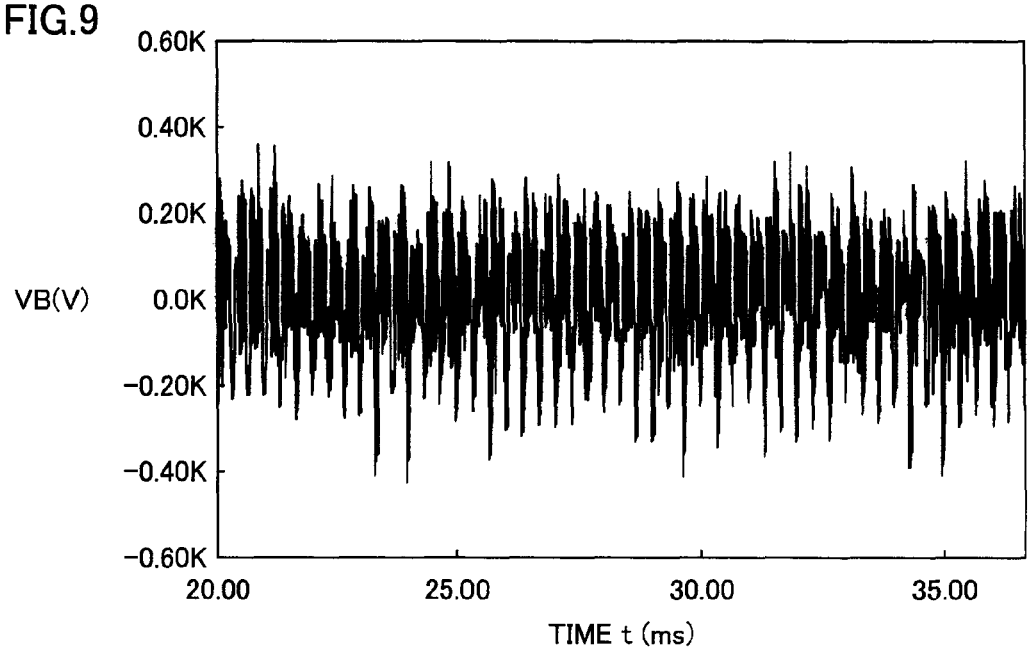
FIG. 9 is a waveform diagram showing a voltage at the negative electrode of the battery during battery discharging in the case shown in FIG. 5.

FIGS. 6(a) and 6(b) are waveform diagrams showing a voltage VT1 at input terminal T1 and a voltage VT2 at output terminal T2, respectively, during battery charging, and FIG. 7 is a waveform diagram showing a voltage VB at the negative electrode of battery 40 during battery charging. Further, FIGS. 8(a) and 8(b) are waveform diagrams showing voltage VT1 at input terminal T1 and voltage VT2 at output terminal T2, respectively, during battery discharging, and FIG. 9 is a waveform diagram showing voltage VB at the negative electrode of battery 40 during battery discharging.

As shown in FIG. 6(a), voltage VT1 at input terminal T1 during battery charging is a voltage in which the ripple voltage is superimposed on the AC voltage supplied from commercial AC power supply 71. As shown in FIG. 6(b), voltage VT2 at output terminal T2 during battery charging is a voltage in which the ripple voltage is superimposed on the AC voltage generated in PWM inverter 9. As shown in FIG. 7, voltage VB (V) at the negative electrode of battery 40 during battery charging is a voltage in which the ripple voltage is superimposed on 0 V.

Further, as shown in FIG. 8(a), voltage VT1 at input terminal T1 during battery discharging is fixed to 0 V, as supply of the AC voltage from commercial AC power supply 71 is stopped. As shown in FIG. 8(b), voltage VT2 at output terminal T2 during battery discharging is a voltage in which the ripple voltage is superimposed on the AC voltage generated in PWM inverter 9. As shown in FIG. 9, voltage VB (V) at the negative electrode of battery 40 during battery discharging is a voltage in which the ripple voltage is superimposed on 0 V.

As described above, when common mode reactor 34 and common mode capacitor 37 are not provided, a large ripple voltage is generated at input terminal T1, output terminal T2, and the electrodes of battery 40, and the ripple voltage negatively affects commercial AC power supply 71, load circuit 72, and battery 40.

Returning to FIG. 1, common mode reactor 34 includes a coil 35 connected between node N6 and the positive electrode of battery 40, and a coil 36 connected between node N7 and the negative electrode of battery 40. Common mode reactor 34 is a reactor that acts as a reactor for the common mode current but does not act as a reactor for the normal mode current.

Therefore, the level of the normal mode current flowing according to the operation of bidirectional chopper circuit 20 is not suppressed by common mode reactor 34, and the level of the common mode current flowing based on the ripple voltage generated at nodes N1 to N3 is suppressed by common mode reactor 34.

Further, common mode capacitor 37 includes a capacitor 38 connected between the positive electrode of battery 40 and virtual neutral line NL, and a capacitor 39 connected between the negative electrode of battery 40 and virtual neutral line NL. Common mode capacitor 37 causes a low-level common mode current limited by common mode reactor 34 to flow to virtual neutral line NL. Therefore, the common mode current flowing to the line of ground voltage GND through stray capacitance 41 of battery 40 can be suppressed to an extremely low level, and the levels of the noise and the ripple voltage can be suppressed.

Figure 10:
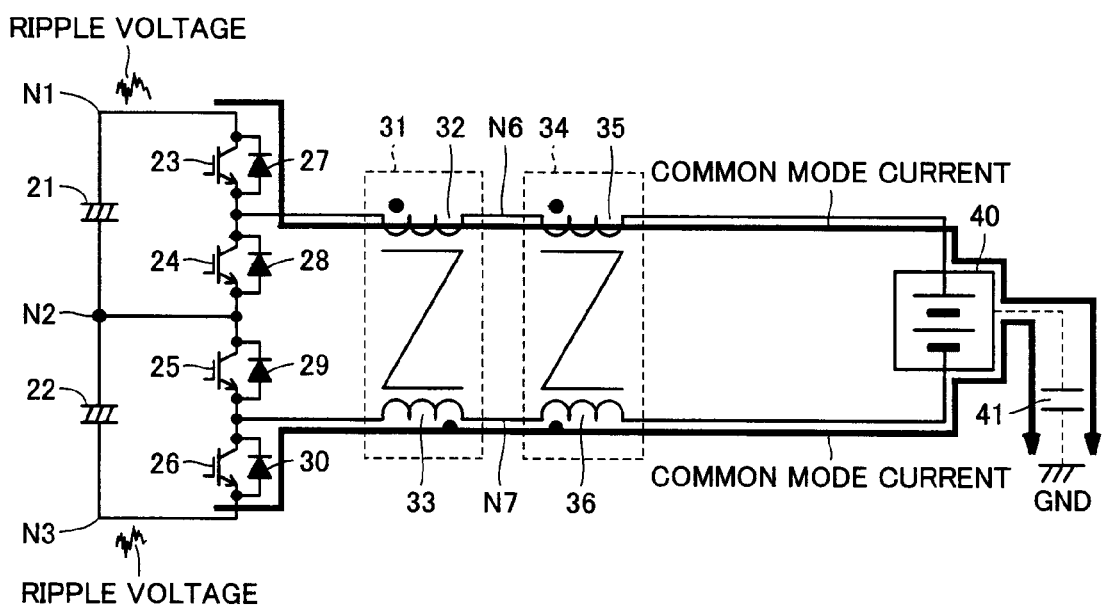
FIG. 10 is a circuit diagram showing the common mode current when the common mode reactor is provided.

Next, the effects of common mode reactor 34 and common mode capacitor 37 will be described using the drawings. Firstly, as shown in FIG. 10, only common mode reactor 34 was provided between normal mode reactor 31 and battery 40, and voltage VT1 at input terminal T1, voltage VT2 at output terminal T2, and voltage VB at the negative electrode of battery 40 were measured.

Figure 13:
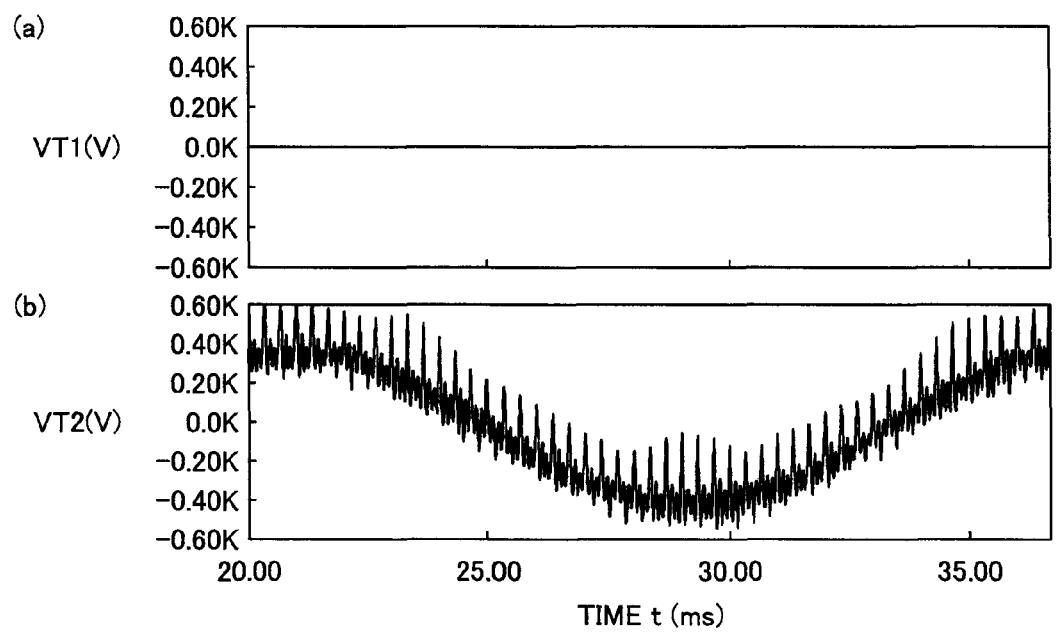
FIG. 13 is a waveform diagram showing voltages at the input terminal and the output terminal during battery discharging in the case shown in FIG. 10.
Figure 14:
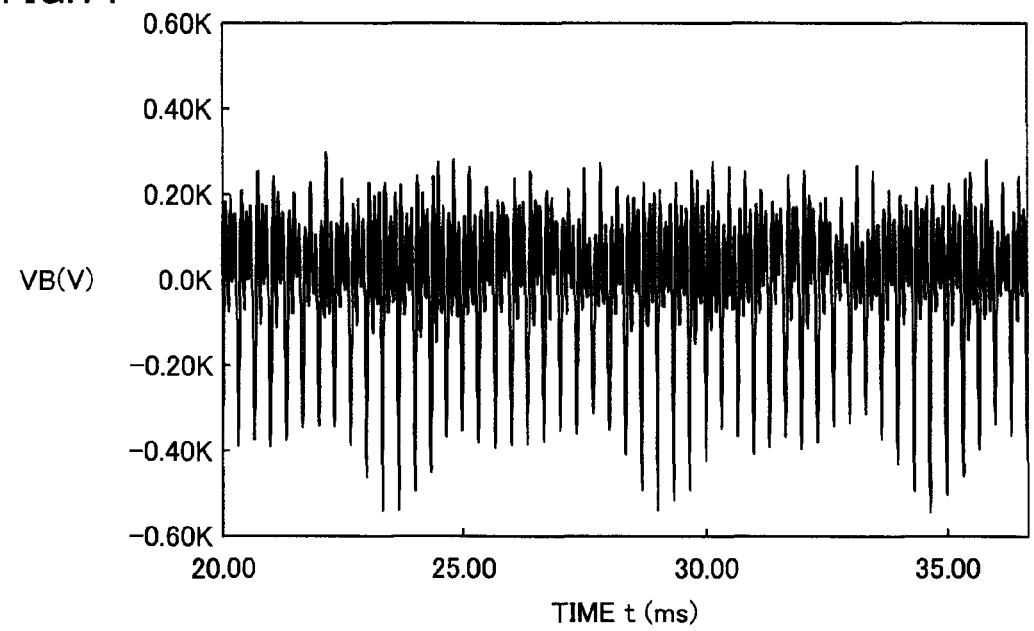
FIG. 14 is a waveform diagram showing a voltage at the negative electrode of the battery during battery discharging in the case shown in FIG. 10.

FIGS. 11(a) and 11(b) are waveform diagrams showing voltage VT1 at input terminal T1 and voltage VT2 at output terminal T2, respectively, during battery charging, and FIG. 12 is a waveform diagram showing voltage VB at the negative electrode of battery 40 during battery charging. Further, FIGS. 13(a) and 13(b) are waveform diagrams showing voltage VT1 at input terminal T1 and voltage VT2 at output terminal T2, respectively, during battery discharging, and FIG. 14 is a waveform diagram showing voltage VB at the negative electrode of battery 40 during battery discharging.

It can be seen from FIGS. 11(a) and 11(b) to FIG. 14 that a high-frequency component of the ripple voltage is reduced when compared with FIGS. 6(a) and 6(b) to FIG. 9. This is considered to be because the level of a high-frequency component of the common mode current is suppressed by common mode reactor 34.

Figure 15:
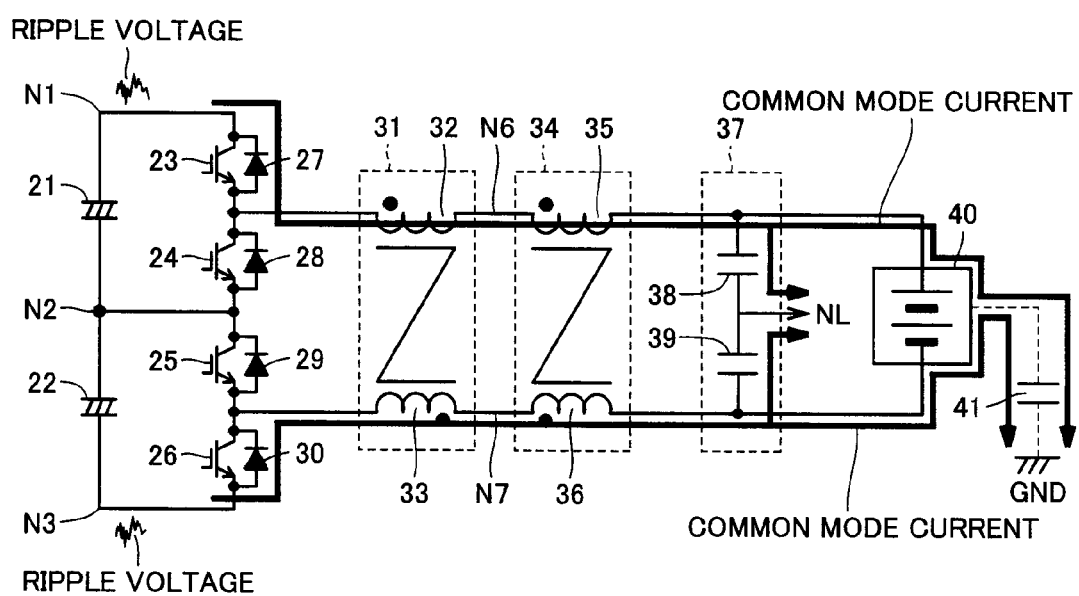
FIG. 15 is a circuit diagram showing the common mode current when the common mode reactor and the common mode capacitor are provided.

Next, as shown in FIG. 15, both common mode reactor 34 and common mode capacitor 37 were provided between normal mode reactor 31 and battery 40, and voltage VT1 at input terminal T1, voltage VT2 at output terminal T2, and voltage VB at the negative electrode of battery 40 were measured.

Figure 16:
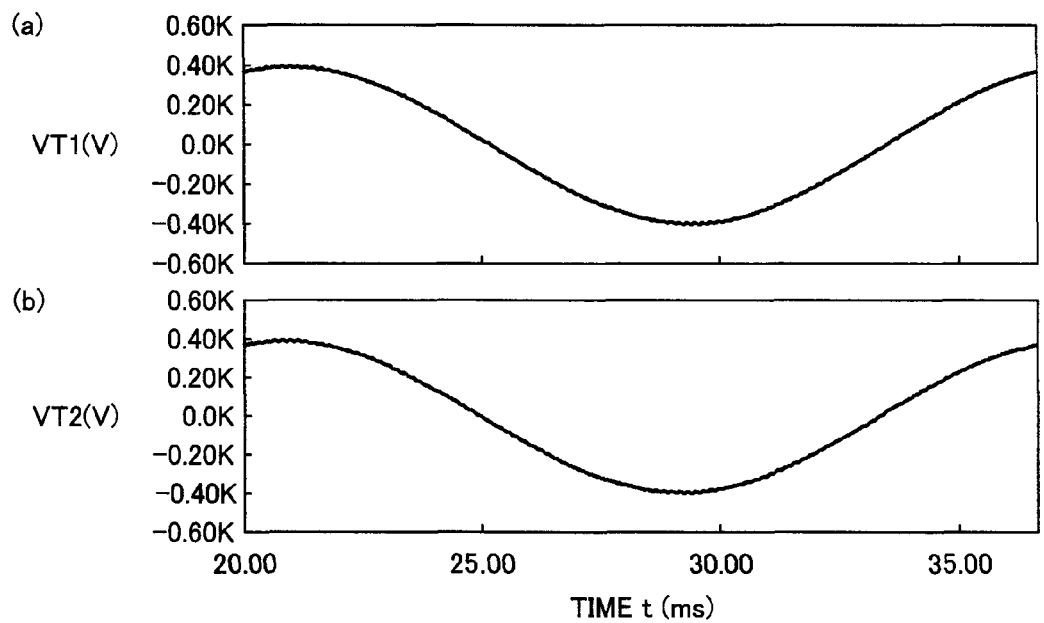
FIG. 16 is a waveform diagram showing voltages at the input terminal and the output terminal during battery charging in a case shown in FIG. 15.
Figure 17:
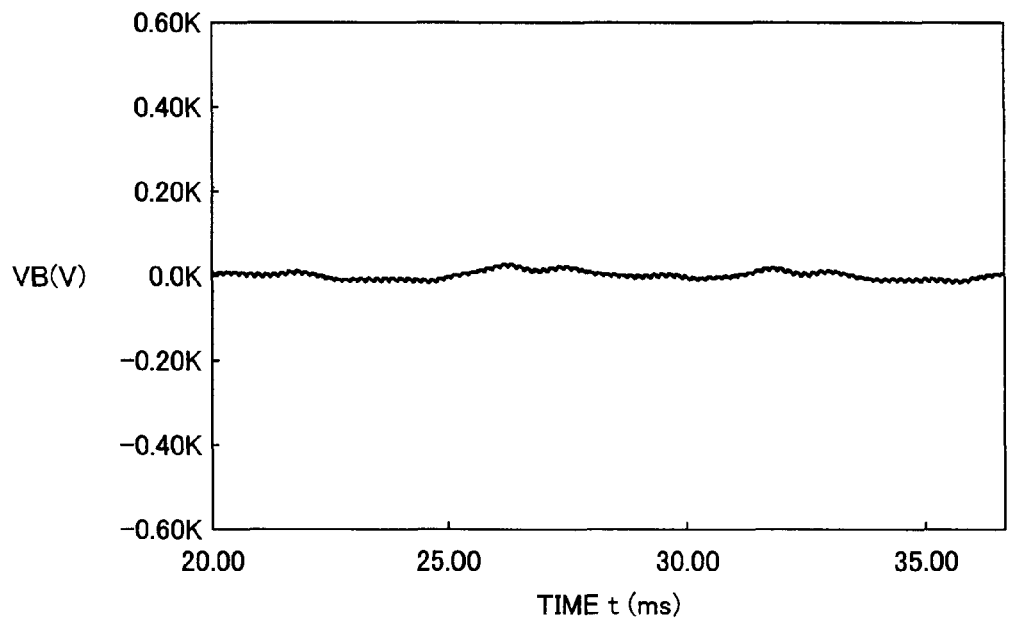
FIG. 17 is a waveform diagram showing a voltage at the negative electrode of the battery during battery charging in the case shown in FIG. 15.
Figure 18:
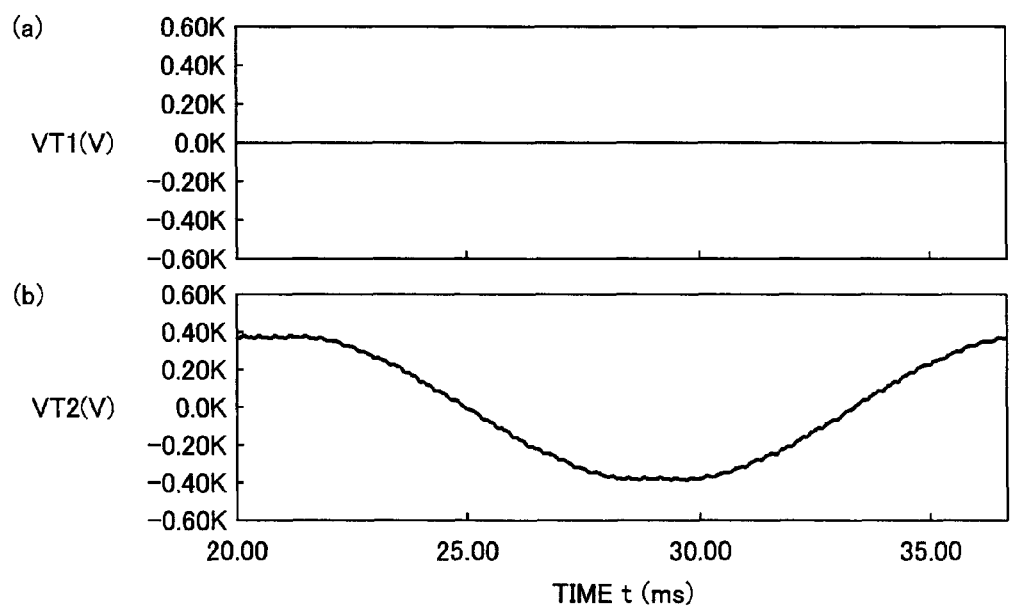
FIG. 18 is a waveform diagram showing voltages at the input terminal and the output terminal during battery discharging in the case shown in FIG. 15.
Figure 19:
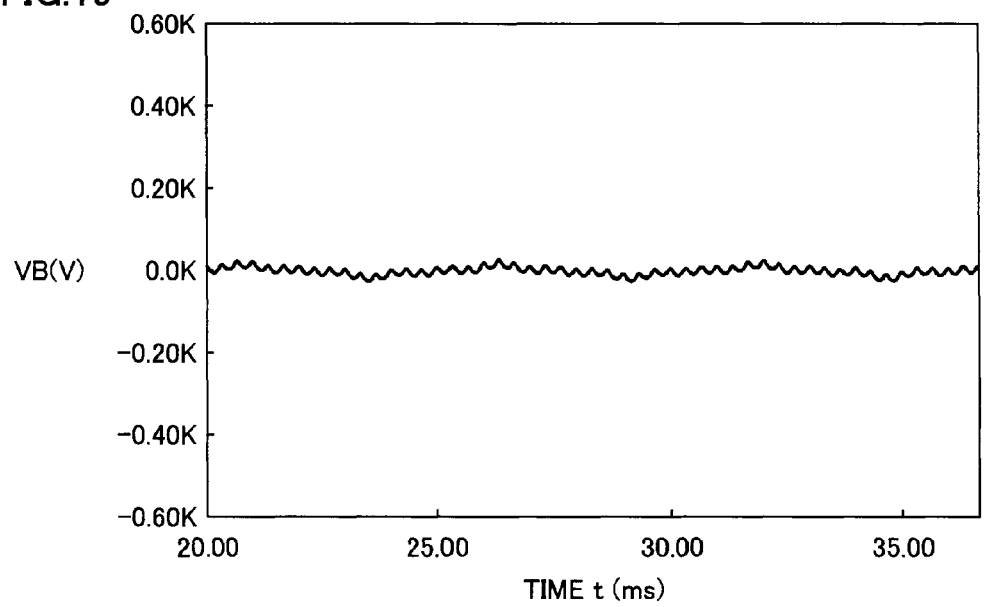
FIG. 19 is a waveform diagram showing a voltage at the negative electrode of the battery during battery discharging in the case shown in FIG. 15.

FIGS. 16(a) and 16(b) are waveform diagrams showing voltage VT1 at input terminal T1 and voltage VT2 at output terminal T2, respectively, during battery charging, and FIG. 17 is a waveform diagram showing voltage VB at the negative electrode of battery 40 during battery charging. Further, FIGS. 18(a) and 18(b) are waveform diagrams showing voltage VT1 at input terminal T1 and voltage VT2 at output terminal T2, respectively, during battery discharging, and FIG. 19 is a waveform diagram showing voltage VB at the negative electrode of battery 40 during battery discharging.

It can be seen from FIGS. 16(a) and 16(b) to FIG. 19 that the ripple voltage is considerably reduced when compared with FIGS. 11(a) and 11(b) to FIG. 14. This is considered to be because most of the common mode current passing through common mode reactor 34 flows to virtual neutral line NL through common mode capacitor 37.

In the first embodiment, the common mode current flowing from nodes N1 to N3 to the line of ground voltage GND through stray capacitance 41 of battery 40 is limited by common mode reactor 34, and thus the level of the noise caused by the common mode current can be reduced.

Further, since the low-level common mode current passing through common mode reactor 34 is caused to flow to virtual neutral line NL through common mode capacitor 37, the level of the ripple voltage that appears at input terminal T1, output terminal T2, the electrodes of battery 40, and the like can be reduced. Therefore, the impact of the ripple voltage on commercial AC power supply 71, load circuit 72, battery 40, and the like can be reduced.

Figure 20:
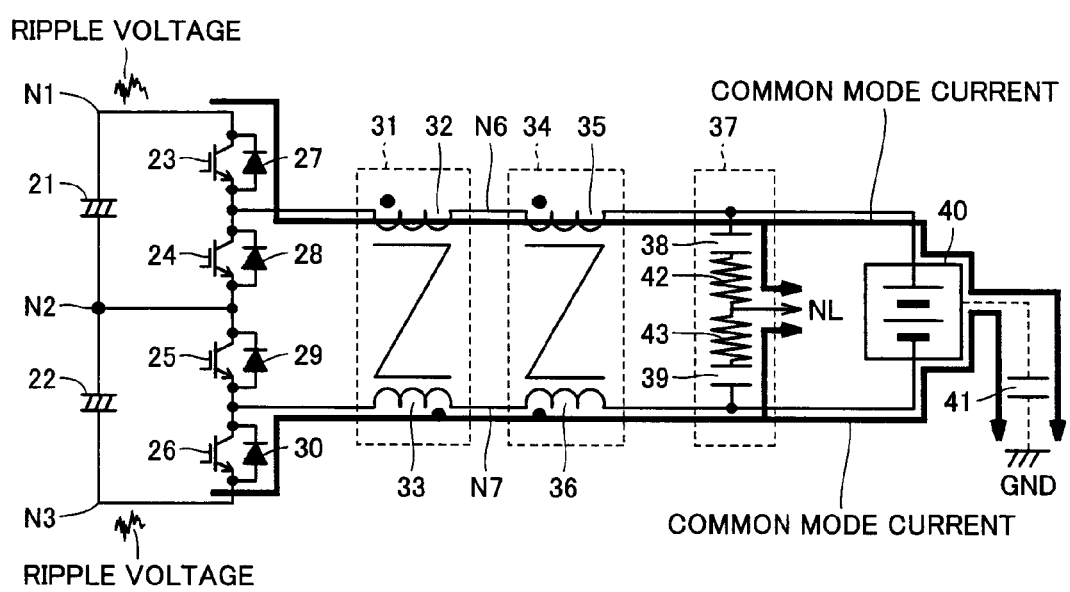
FIG. 20 is a circuit diagram showing a modification of the first embodiment.

It is to be noted that, as shown in FIG. 20, resistive elements 42 and 43 may be added to common mode capacitor 37. Capacitor 38 and resistive element 42 are connected in series between the positive electrode of battery 40 and virtual neutral line NL, and capacitor 39 and resistive element 43 are connected in series between the negative electrode of battery 40 and virtual neutral line NL. In this case, the common mode current flowing into virtual neutral line NL can be adjusted to an appropriate value.

Second Embodiment

Figure 21:
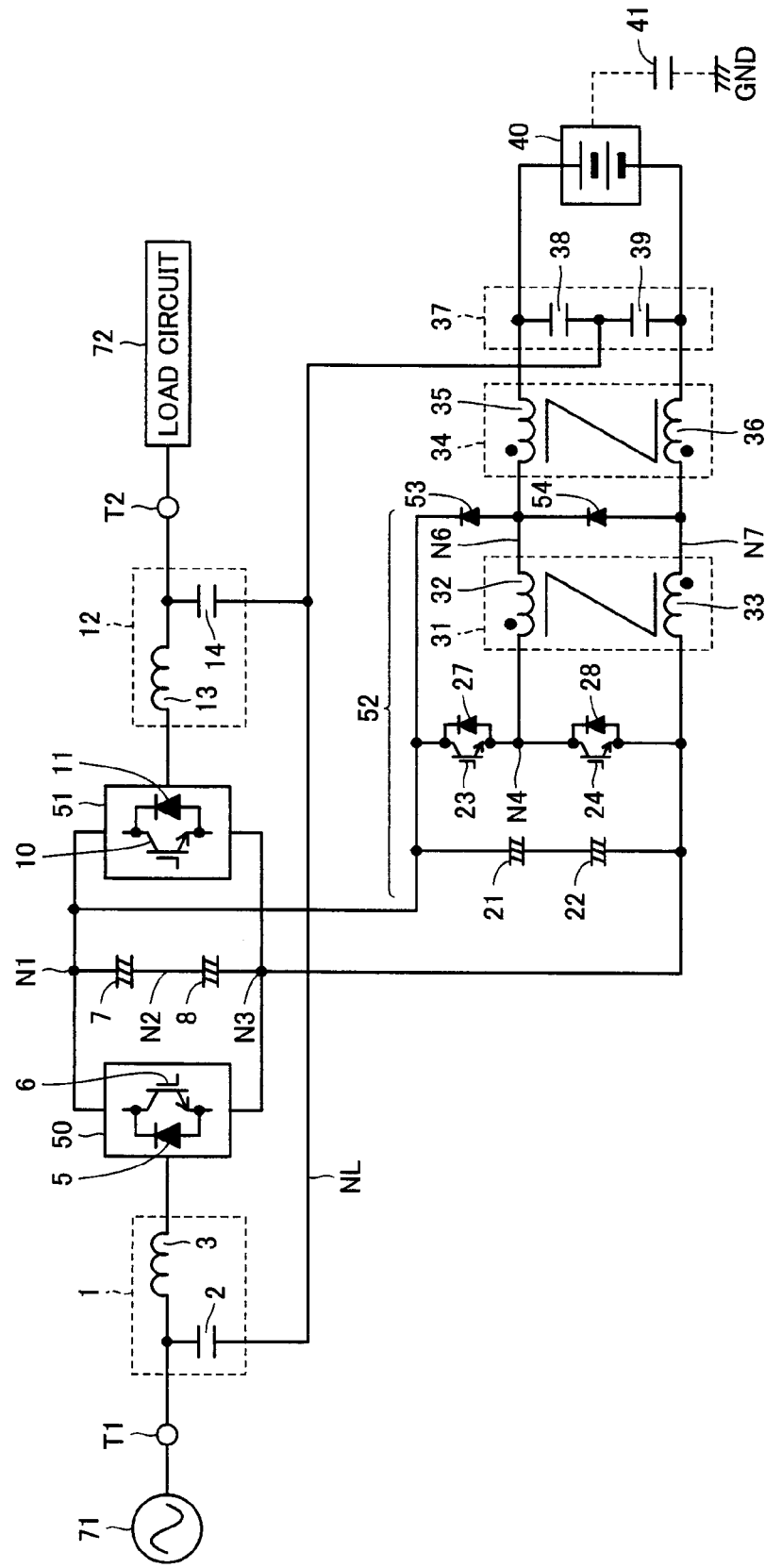
FIG. 21 is a circuit block diagram showing a configuration of an uninterruptible power supply apparatus according to a second embodiment of the present invention.

FIG. 21 is a circuit block diagram showing a configuration of an uninterruptible power supply apparatus according to a second embodiment of the present invention, which is compared with FIG. 1. Referring to FIG. 21, the uninterruptible power supply apparatus is different from the uninterruptible power supply apparatus of FIG. 1 in that PWM converter 4, PWM inverter 9, and bidirectional chopper circuit 20 are replaced by a PWM converter 50, a PWM inverter 51, and a bidirectional chopper circuit 52, respectively. Node N2 is separated from PWM converter 50, PWM inverter 51, and bidirectional chopper circuit 52.

PWM converter 50 is a well-known one including a plurality of sets of diodes 5 and IGBT elements 6, and generates a positive voltage and a negative voltage based on the AC voltage supplied from commercial AC power supply 71 via AC input filter 1. The positive voltage and the negative voltage generated in PWM converter 50 are supplied to nodes N1 and N3, respectively. It is to be noted that capacitors 7 and 8 may be replaced by one capacitor.

PWM inverter 51 is a well-known one including a plurality of sets of IGBT elements 10 and diodes 11, and generates AC voltage based on the positive voltage and the negative voltage at nodes N1 and N3. Bidirectional chopper circuit 52 supplies DC power from capacitors 7 and 8 to battery 40 when the AC voltage is supplied from commercial AC power supply 71, and supplies DC power from battery 40 to capacitors 7 and 8 when supply of the AC voltage from commercial AC power supply 71 is stopped, that is, when power failure occurs.

Bidirectional chopper circuit 52 is configured by removing IGBT elements 25 and 26 and diodes 29 and 30 from bidirectional chopper circuit 20 of FIG. 1 and adding diodes 53 and 54 thereto. IGBT element 24 is connected between nodes N4 and N3. Node N4 is separated from a node between capacitors 21 and 22. Diode 53 is connected between nodes N6 and N1, and diode 54 is connected between nodes N7 and N6.

To charge battery 40, IGBT element 23 is placed in a conductive state and a nonconductive state (i.e., turned on/off) at a prescribed frequency. When IGBT element 23 becomes conductive, a current flows from node N1, through IGBT element 23, coils 32 and 35, battery 40, and coils 36 and 33, to node N3, and electromagnetic energy is stored in coils 32, 33, 35, and 36 and battery 40 is charged. When IGBT element 23 becomes nonconductive, a current flows through a path including coils 32 and 35, battery 40, coils 36 and 33, and diode 28, or a path including coil 35, battery 40, coil 36, and diode 54, and the electromagnetic energy in coils 32, 33, 35, and 36 is released and battery 40 is charged.

To discharge battery 40, IGBT element 24 is placed in a conductive state and a nonconductive state at a prescribed frequency. When IGBT element 24 becomes conductive, a current flows from battery 40, through a path including coils 35 and 32, IGBT element 24, and coils 33 and 36, and electromagnetic energy is stored in coils 32, 33, 35, and 36. When IGBT element 24 becomes nonconductive, a current flows from battery 40, through a path including coils 35 and 32, diode 27, capacitors 7 and 8 (and capacitors 21 and 22), and coils 33 and 36, and the electromagnetic energy in coils 32, 33, 35, and 36 is released and capacitors 7 and 8 (and capacitors 21 and 22) are charged. Since other configurations and operations are the same as those in the first embodiment, the description thereof will not be repeated.

In the second embodiment, an effect identical to that of the first embodiment can also be obtained.

It is needless to say that resistive elements 42 and 43 may also be added to common mode capacitor 37 as shown in FIG. 20 in the second embodiment.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

The invention claimed is:

1. An uninterruptible power supply apparatus, comprising:
a PWM converter that generates a DC voltage based on a first AC voltage and outputs the DC voltage between first and second nodes;
a first capacitor connected between said first and second nodes;
a PWM inverter that receives said DC voltage and generates a second AC voltage;
a common mode reactor having first and second coils, one terminal of the first coil being connected to a positive electrode of a battery, and one terminal of the second coil being connected to a negative electrode of said battery; and
a bidirectional chopper circuit, connected to said first and second nodes and connected to the other terminals of said first and second coils, that supplies DC power from said first capacitor to said battery through said common mode reactor when said first AC voltage is supplied, and supplies DC power from said battery to said first capacitor through said common mode reactor when a supply of said first AC voltage is stopped,
said bidirectional chopper circuit including
first and second switching elements connected in series between said first and second nodes, and
a normal mode reactor having a third coil connected between a third node between said first and second switching elements and the other terminal of said first coil, and a fourth coil connected to said second switching element and the other terminal of said second coil.

2. The uninterruptible power supply apparatus according to claim 1, further comprising:
a second capacitor connected between the positive electrode of said battery and a virtual neutral line; and
a third capacitor connected between the negative electrode of said battery and said virtual neutral line.

3. An uninterruptible power supply apparatus, comprising:
a PWM converter that generates a DC voltage based on a first AC voltage and outputs the DC voltage between first and second nodes;
a first capacitor connected between said first and second nodes;
a PWM inverter that receives said DC voltage and generates a second AC voltage;
a common mode reactor having first and second coils, one terminal of the first coil being connected to a positive electrode of a battery, and one terminal of the second coil being connected to a negative electrode of said battery;
a second capacitor connected between the positive electrode of said battery and a virtual neutral line;
a third capacitor connected between the negative electrode of said battery and said virtual neutral line;
a bidirectional chopper circuit, connected to said first and second nodes and connected to the other terminals of said first and second coils, that supplies DC power from said first capacitor to said battery through said common mode reactor when said first AC voltage is supplied, and supplies DC power from said to said first capacitor through said common mode reactor when a supply of said first AC voltage is stopped;
a first resistive element connected in series with said second capacitor between the positive electrode of said battery and said virtual neutral line; and
a second resistive element connected in series with said third capacitor between the negative electrode of said battery and said virtual neutral line.

4. The uninterruptible power supply apparatus according to claim 2, further comprising:
a fourth capacitor connected between said virtual neutral line and a line of said first AC voltage; and
a fifth capacitor connected between said virtual neutral line and a line of said second AC voltage.

5. The uninterruptible power supply apparatus according to claim 1, wherein
said first capacitor includes
a first sub capacitor connected between said first node and said third node, and
a second sub capacitor connected between said second node and said third node,
said PWM converter generates a positive voltage, a negative voltage, and a neutral point voltage based on said first AC voltage and outputs the voltages to said first to third nodes, respectively,
said PWM inverter receives said positive voltage, said negative voltage, and said neutral point voltage and generates said second AC voltage,
said bidirectional chopper circuit supplies the DC power from said first and second sub capacitors to said battery when said first AC voltage is supplied, and supplies the DC power from said battery to said first and second sub capacitors when the supply of said first AC voltage is stopped, said bidirectional chopper circuit includes
- a third switching element connected to said first switching element in series between said first and third nodes,
- a fourth switching element connected to said second switching element in series between said third and second nodes, and
- first to fourth diodes connected in antiparallel with said first to fourth switching elements, respectively,
- the third coil connected between said first and third switching elements, the fourth coil connected between said second and fourth switching elements, and said first and fourth switching elements are alternately placed in a conductive state during a charging of said battery, and said second and third switching elements are alternately placed in a conductive state during a discharging of said battery.

6. The uninterruptible power supply apparatus according to claim 1, wherein
said bidirectional chopper circuit includes
- first and second diodes connected in antiparallel with said first and second switching elements, respectively,
- the fourth coil connected to said second node, and said first switching element is placed in a conductive state and a nonconductive state at a prescribed frequency during a charging of said battery, and said second switching element is placed in a conductive state and a nonconductive state at a prescribed frequency during a discharging of said battery.

7. An uninterruptible power supply apparatus, comprising:
a PWM converter that generates a DC voltage based on a first AC voltage and outputs the DC voltage to between first and second nodes;
a first capacitor connected between said first and second nodes;
a PWM inverter that receives said DC voltage and generates a second AC voltage;
a bidirectional chopper circuit connected to said first and second nodes, that supplies DC power from said first capacitor to a battery when said first AC voltage is supplied, and supplies DC power from said battery to said first capacitor when a supply of said first AC voltage is stopped;
a second capacitor connected between a positive electrode of said battery and a virtual neutral line;
a third capacitor connected between a negative electrode of said battery and said virtual neutral line; and
a fourth capacitor connected between said virtual neutral line and a line of said first AC voltage.

8. An uninterruptible power supply apparatus, comprising:
a PWM converter that generates a DC voltage based on a first AC voltage and outputs the DC voltage to between first and second nodes;
a first capacitor connected between said first and second nodes;
a PWM inverter that receives said DC voltage and generates a second AC voltage;
a bidirectional chopper circuit, connected to said first and second nodes, that supplies DC power from said first capacitor to a battery when said first AC voltage is supplied, and supplies DC power from said battery to said first capacitor when a supply of said first AC voltage is stopped;
a second capacitor connected between a positive electrode of said battery and a virtual neutral line;
a third capacitor connected between a negative electrode of said battery and said virtual neutral line;
a first resistive element connected in series with said second capacitor between the positive electrode of said battery and said virtual neutral line; and
a second resistive element connected in series with said third capacitor between the negative electrode of said battery and said virtual neutral line.

9. The uninterruptible power supply apparatus according to claim 7, further comprising:
a fifth capacitor connected between said virtual neutral line and a line of said second AC voltage.

10. The uninterruptible power supply apparatus according to claim 7, wherein
said first capacitor includes
- a first sub capacitor connected between said first node and a third node, and
- a second sub capacitor connected between said second node and said third node, said PWM converter generates a positive voltage, a negative voltage, and a neutral point voltage based on said first AC voltage and outputs the voltages to said first to third nodes, respectively, said PWM inverter receives said positive voltage, said negative voltage, and said neutral point voltage and generates said second AC voltage, said bidirectional chopper circuit supplies the DC power from said first and second sub capacitors to said battery when said first AC voltage is supplied, and supplies the DC power from said battery to said first and second sub capacitors when the supply of said first AC voltage is stopped, said bidirectional chopper circuit includes
- first and second switching elements connected in series between said first and third nodes,
- third and fourth switching elements connected in series between said third and second nodes,
- first to fourth diodes connected in antiparallel with said first to fourth switching elements, respectively, and
- a normal mode reactor having a third coil connected between a fourth node between said first and second switching elements and the positive electrode of said battery, and a fourth coil connected between the negative electrode of said battery and a fifth node between said third and fourth switching elements, and said first and fourth switching elements are alternately placed in a conductive state during a charging of said battery, and said second and third switching elements are alternately placed in a conductive state during a discharging of said battery.

11. The uninterruptible power supply apparatus according to claim 7, wherein
said bidirectional chopper circuit includes
- first and second switching elements connected in series between said first and second nodes,
- first and second diodes connected in antiparallel with said first and second switching elements, respectively, and
- a normal mode reactor having a third coil connected between a fourth node between said first and second switching elements and the positive electrode of said battery, and a fourth coil connected between the negative electrode of said battery and said second node, and said first switching element is placed in a conductive state and a nonconductive state at a prescribed frequency during a charging of said battery, and said second switching element is placed in a conductive state and a nonconductive state at a prescribed frequency during a discharging of said battery.

12. The uninterruptible power supply apparatus according to claim 3, further comprising:
a fourth capacitor connected between said virtual neutral line and a line of said first AC voltage; and
a fifth capacitor connected between said virtual neutral line and a line of said second AC voltage.

* * * * *